(12) United States Patent
Smith-Creasey (10) Patent No.: US 12,250,214 B2
(45) Date of Patent: Mar. 11, 2025

(54) METHOD, DATA PROCESSING SYSTEM AND COMPUTER PROGRAM FOR SECURING FUNCTIONALITY OF A USER DEVICE CONNECTED TO A LOCAL NETWORK

(71) Applicant: BRITISH TELECOMMUNICATIONS PUBLIC LIMITED COMPANY, London (GB)

(72) Inventor: Max Smith-Creasey, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 294 days.

(21) Appl. No.: 17/802,634

(22) PCT Filed: Feb. 17, 2021

(86) PCT No.: PCT/EP2021/053857
§ 371 (c)(1),
(2) Date: Aug. 26, 2022

(87) PCT Pub. No.: WO2021/170466
PCT Pub. Date: Sep. 2, 2021

(65) Prior Publication Data
US 2023/0108872 A1    Apr. 6, 2023

(30) Foreign Application Priority Data

Feb. 27, 2020    (EP) ..................................... 20159751

(51) Int. Cl.
*H04L 29/06*    (2006.01)
*H04L 9/40*    (2022.01)

(52) U.S. Cl.
CPC ...... *H04L 63/0861* (2013.01); *H04L 63/0876* (2013.01); *H04L 63/102* (2013.01); *H04L 63/20* (2013.01)

(58) Field of Classification Search
None
See application file for complete search history.

(56) References Cited

U.S. PATENT DOCUMENTS 9,584,520 B2    2/2017   Logue et al.
9,654,978 B2    5/2017   Lundblade et al.
(Continued)

FOREIGN PATENT DOCUMENTS

AU    2016421889         12/2018
TW    201643756 A  *   12/2016   ............. G06F 7/026
(Continued)

OTHER PUBLICATIONS

International Preliminary Report on Patentability for PCT/EP2021/053857 dated Sep. 9, 2022 (8 pages).
(Continued)

*Primary Examiner* — Andrew J Steinle
(74) *Attorney, Agent, or Firm* — Nixon & Vanderhye P.C.

(57) ABSTRACT

The present disclosure relates to the security of user devices connected to local networks, such as devices comprised in the Internet of Things' (IoT). An aspect relates to a computer-implemented method of securing functionality of a user device connected to a local network provided at a premises, the method comprising: determining a premises trust score indicative of a likelihood that an authorised user of the user device is present at the premises, the determining being in dependence on: (i) data received from one or more biometric-capable devices, distinct from the user device, connected to the local network, that data being indicative of continuous biometric authentication of a current user of the (Continued)

respective biometric-capable device; or (ii) a lack thereof; then causing the user device to respond to a request for functionality made through a local user interface it comprises in a manner which depends on the premises trust score.

18 Claims, 3 Drawing Sheets

(56) References Cited

U.S. PATENT DOCUMENTS

| | | | |
|---|---|---|---|
| 10,032,008 | B2 | 7/2018 | Griffiths et al. |
| 10,057,264 | B1 | 8/2018 | ElNakib et al. |
| 10,091,272 | B2 | 10/2018 | Cho et al. |
| 10,339,294 | B2 | 7/2019 | Rouse et al. |
| 2014/0359722 | A1 | 12/2014 | Schultz et al. |
| 2015/0035643 | A1 | 2/2015 | Kursun |
| 2015/0242605 | A1 | 8/2015 | Du et al. |
| 2017/0227995 | A1 | 8/2017 | Lee et al. |

FOREIGN PATENT DOCUMENTS

| | | |
|---|---|---|
| WO | 2017/144768 | 8/2017 |
| WO | WO-2017144768 A1 * | 8/2017 |

OTHER PUBLICATIONS

Chuang, Y. et al., "A Lightweight Continuous Authentication Protocol for the Internet of Things" Apr. 5, 2018, Sensors, vol. 18, No. 104 (26 pages).
Combined Search and Examination Report for GB2002762.9 dated Oct. 30, 2020 (13 pages).
Ashibani, Y. et al., "Design and Implementation of a Contextual-Based Continuous Authentication Framework for Smart Homes" Jan. 17, 2019. Applied System Innovation, vol. 2, No. 4 (20 pages).
Agadakos, I. et al., "Location-enhanced authentication using the IoT", Dec. 5, 2016. Computer Security Applications, pp. 251-264 (14 pages).
International Search Report and Written Opinion of the ISA for PCT/EP2021/053857 dated Mar. 30, 2021 (14 pages).
Premarathne, U. "Reliable context-aware multi-attribute continuous authentication framework for secure energy utilization management in smart homes" Oct. 23, 2015., U.S. Premarathne / Energy, vol. 93, pp. 1210-1221 (12 pages).
Santoso, F. et al, "Securing IoT for Smart Home System" 2015. 2015 IEEE International Symposium on Consumer Electronics (ISCE) (2 pages).
Extended European Search Report for EP 20159751.5 dated Aug. 28, 2020 (8 pages).
Bamasag, O. et al., "Towards Continuous Authentication in Internet of Things Based on Secret Sharing Scheme" 2015 (8 pages).

* cited by examiner

METHOD, DATA PROCESSING SYSTEM AND COMPUTER PROGRAM FOR SECURING FUNCTIONALITY OF A USER DEVICE CONNECTED TO A LOCAL NETWORK

This application is the U.S. national phase of International Application No. PCT/EP2021/053857 filed Feb. 17, 2021 which designated the U.S. and claims priority to EP 20159751.5 filed Feb. 27, 2020, the entire contents of each of which are hereby incorporated by reference.

FIELD

The present disclosure relates to the security of user devices connected to local networks, such as devices comprised in the 'Internet of Things' (IoT).

More specifically, an aspect relates to a computer-implemented method of securing functionality of a user device connected to a local network provided at a premises. Further aspects relate to a data processing system comprising a processor configured to perform such a method, a computer program comprising instructions which, when the program is executed by a computer, cause the computer to carry out such a method, a computer-readable data carrier having stored thereon such a computer program and a data carrier signal carrying such a computer program.

BACKGROUND

As an increasing number of devices become connected, in the sense of being provided with the means to communicate data, premises such as homes and workplaces are increasingly becoming 'smart' environments which support IoT device communication over networks local to the premises. Such local networks can also provide access to remote systems and networks, for example via the provision of internet access.

Individuals occupying smart environments are becoming increasingly accustomed to the convenience provided by their local IoT and familiar with opportunities to perform tasks with the aid of connected devices. For example, connected refrigerators can provide convenient online grocery shopping functionality, smart televisions (TVs) can provide easy access to pay-per-view and/or age-restricted content and voice assistant devices can provide access to data which may be confidential, such as details of meetings stored in an individual's electronic calendar.

It can be seen that some IoT device functionality, including all of the examples above, may need to be secured against unauthorised use. Currently, authorisation to access functionality is often assumed when requested via a user interface of a device connected to a local network associated with a premises, on the basis that only authorised users have physical access to the premises. However, these devices are vulnerable to use by unauthorised individuals. Such individuals include for example criminals who have gained access to a premises illegally, individuals such as dishonest tradespeople who have a legitimate reason for physical access to the premises but not for use of IoT devices within it, and classes of individuals such as children (in their home) or non-managerial staff (in their workplace) who may be authorised to make use of some IoT device functions but restricted from others.

Some IoT devices secure their functionality by requiring authentication credentials to be provided by the user. However, this decreases the convenience of the user experience and increases the time taken to access secured functionality.

What is needed is a way of providing appropriate security for IoT device functionality without adversely impacting the experience of authorised users.

SUMMARY

According to a first aspect, there is provided a computer-implemented method of securing functionality of a user device connected to a local network provided at a premises, the method comprising:
  determining a premises trust score indicative of a likelihood that an authorised user of the user device is present at the premises, the determining being in dependence on:
    (i) data received from one or more biometric-capable devices, distinct from the user device, connected to the local network, that data being indicative of continuous biometric authentication of a current user of the respective biometric-capable device; or
    (ii) a lack thereof;
  then causing the user device to respond to a request for functionality made through a local user interface it comprises in a manner which depends on the premises trust score.

The determining step can be performed periodically.

When the determining is in dependence on option (i) above, the method can further comprise:
  establishing a connection with one of the one or more biometric-capable devices over the local network; and
  subsequently receiving the data from that biometric-capable device, the determining step being responsive thereto.

The method can further comprise receiving an indication that the request for functionality has been made at the user device; the determining step being performed in response thereto.

When the determining is in dependence on option (i) above and the data is received from a plurality of the biometric-capable devices, the method can further comprise receiving the data from the plurality of biometric-capable devices; and the determining step can comprise calculating a weighted average of device trust scores indicated by that data for each of the plurality of biometric-capable devices, each device trust score being indicative of a likelihood that the authorised user of the user device is the current user of the respective biometric-capable device.

The step of causing the user device to respond to the request for functionality can comprise one of:
  controlling the user device to respond to the request for functionality in a particular manner;
  selecting a policy which defines a permitted response to the request for functionality from a plurality of such policies, the selecting being made in dependence on the premises trust score, then transmitting the selected policy to the user device for the user device to enforce; and
  indicating the premises trust score to the user device.

According to a second aspect, there is provided a data processing system comprising a processor configured to perform the method of the first aspect.

The data processing system can comprise:
  a local network access point for the local network; and/or
  a server outside of, but in communication with, the local network; and/or
  the user device.

According to a third aspect, there is provided a computer program comprising instructions which, when the program is executed by a computer, cause the computer to carry out the method of the first aspect.

According to a fourth aspect, there is provided a computer-readable data carrier having stored thereon the computer program of the third aspect.

According to a fifth aspect, there is provided a data carrier signal carrying the computer program of the third aspect.

BRIEF DESCRIPTION OF THE FIGURES

Aspects of the present disclosure will now be described by way of example with reference to the accompanying figures. In the figures.

DETAILED DESCRIPTION OF THE FIGURES

The following description is presented to enable any person skilled in the art to make and use the system, and is provided in the context of a particular application. Various modifications to the disclosed embodiments will be readily apparent to those skilled in the art.

According to the present disclosure, appropriate security for IoT device functionality is provided without adversely impacting the experience of authorised users. This is achieved via continuous biometric authentication, wherein the user of a device is authenticated "in the background" through monitoring their biometrics over time. The biometrics are collected by one or more biometric-capable devices connected to a local network provided at a premises such as a home or business property. The biometric data is then aggregated to determine a premises trust score, indicating how likely it is that an authorised user of a user device connected to the local network is present at the premises. This premises trust score is then used to determine how to respond to a request for functionality received by the user device.

Biometrics are measurable, distinctive characteristics of a human which can be used to label and describe individuals. Individuals can therefore be identified using one, or a combination, of their biometrics. Biometrics include physiological characteristics and behavioural characteristics. The term 'biometric-capable device' is used herein to refer to any device comprising functionality to measure one or more biometrics.

Continuous authentication refers to authentication which takes place on an on-going basis. This is in contrast to traditional authentication, which is prompted by a specific external stimulus indicating a request for functionality requiring authentication. (In the traditional case, the request for functionality could be specific, for example requesting access to a protected file, or more general, for example requesting log-in to a device which enables multiple functions of that device.) Continuous authentication is based on measurements obtained from a user passively, i.e. without the user being required to knowingly perform any particular prompted or remembered action. Measurements to achieve continuous biometric authentication can be taken by sampling one or more continuous sensor outputs and/or by triggering one or more sensors as required. Measurements can be taken continually; i.e. one after another, as quickly as the measurement apparatus allows. Alternatively they can be taken on a routine basis. For example a measurement or series of measurements could accompany any action or any of a class of actions (as opposed to a specific action) implemented on or by the biometric-capable device, e.g. handling of the biometric-capable device and/or use of any user input device comprised in the device and/or receipt or transmission of a communication by the biometric-capable device. Measurements could alternatively be taken on a particular temporal basis, for example a regular (e.g. periodic) basis, according to some other temporal pattern or randomly triggered (e.g. according to a stochastic variable).

Figure 1:
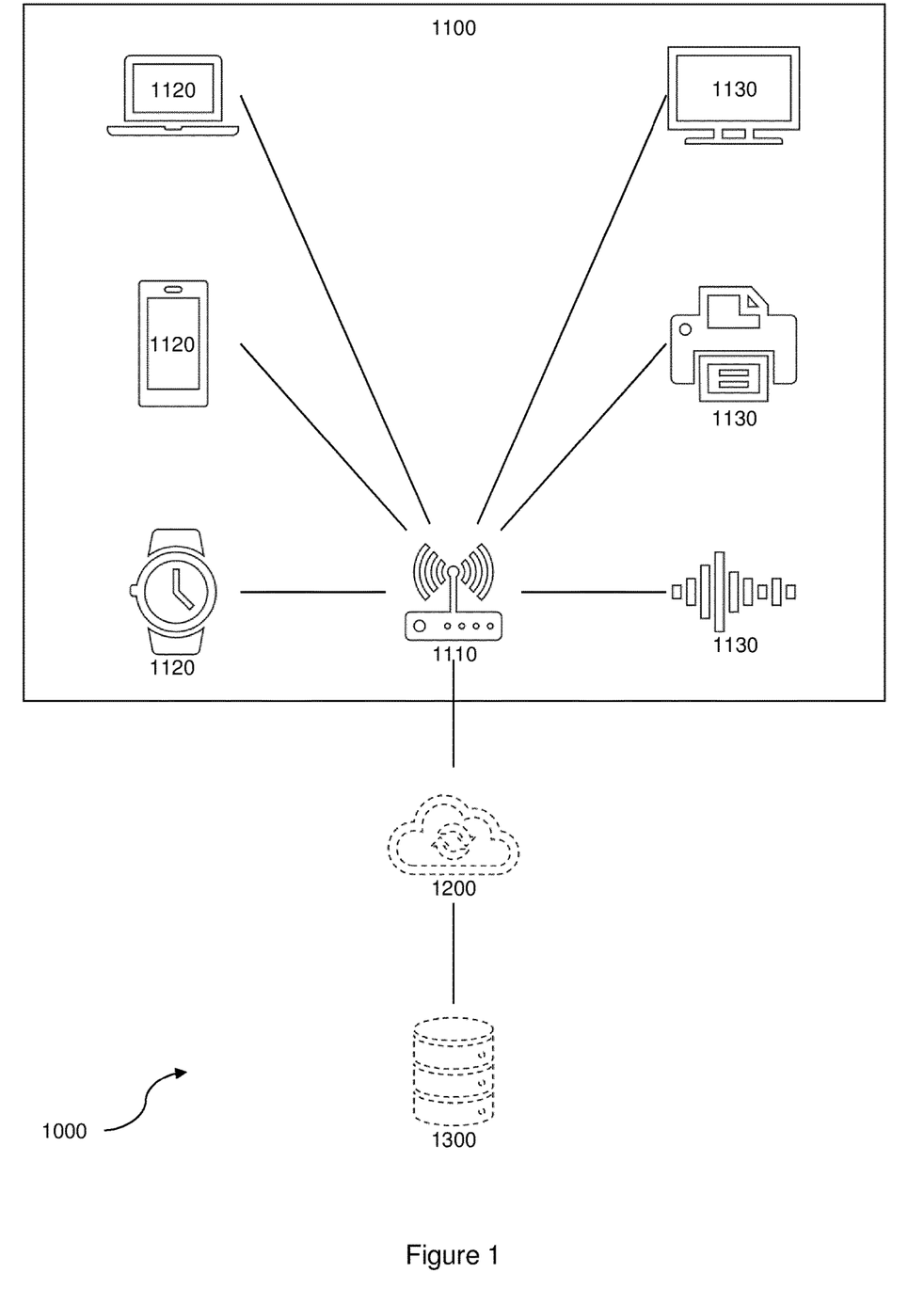
FIG. 1 schematically illustrates an example system in which the methods of the present disclosure can be employed.

FIG. 1 illustrates an example system 1000 in which this approach can be employed. A premises 1100 is provided with a local network by means of an access point 1110. One or more biometric-capable devices 1120 are provided with access to the local network of the premises 1100 through wired and/or wireless connections to the access point 1110. These biometric-capable devices 1120 can for example include one or more of desktop, laptop and tablet computers, smartphones, smartwatches, smartglasses, smart clothing and smart gym equipment. One or more user devices 1130 are also provided with access to the local network of the premises 1100 through wired and/or wireless connections to the access point 1110. These user devices 1130 can for example include one or more of smart televisions (TVs), smart refrigerators, connected printers and voice assistant devices.

The access point 1110 can optionally be connected to a wider network, for example the Internet 1200, in order to communicate with one or more remote servers 1300.

Although only a single access point 1110 is shown in FIG. 1, the local network could employ multiple access points and/or signal boosters to perform this function.

Figure 2A:
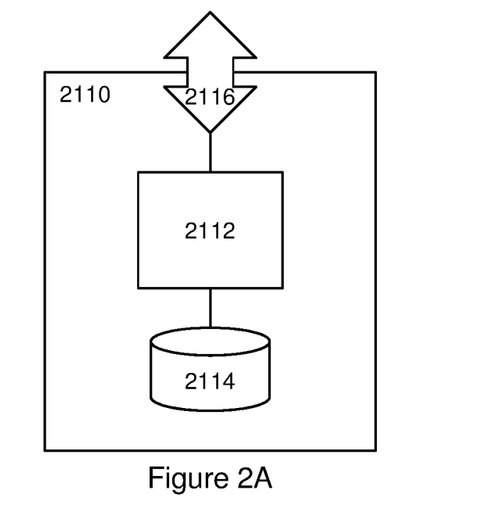
FIG. 2A schematically illustrates an example access point.

FIG. 2A schematically illustrates an example access point 2110 (which could for example correspond to the access point 1110 of FIG. 1) comprising a processor 2112 operably connected to each of a memory 2114 and a transceiver 2116.

Figure 2B:
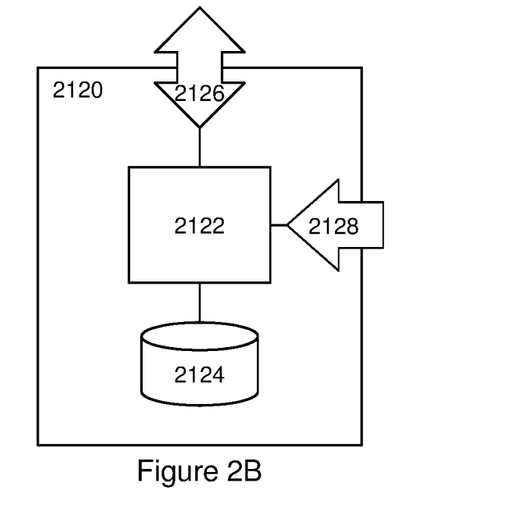
FIG. 2B schematically illustrates an example biometric-capable device.

FIG. 2B schematically illustrates an example biometric-capable device 2120 (which could for example correspond to one or more of the biometric-capable devices 1120 of FIG. 1) comprising a processor 2122 operably connected to each of a memory 2124, a transceiver 2126 and one or more biometric sensors 2128.

Figure 2C:
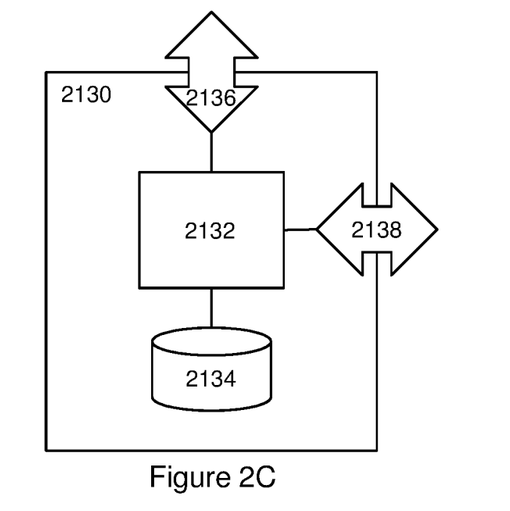
FIG. 2C schematically illustrates an example user device.

FIG. 2C schematically illustrates an example user device 2130 (which could for example correspond to one or more of the user devices 1130 of FIG. 1) comprising a processor 2132 operably connected to each of a memory 2134, a transceiver 2136 and one or more user interfaces 2138.

Figure 2D:
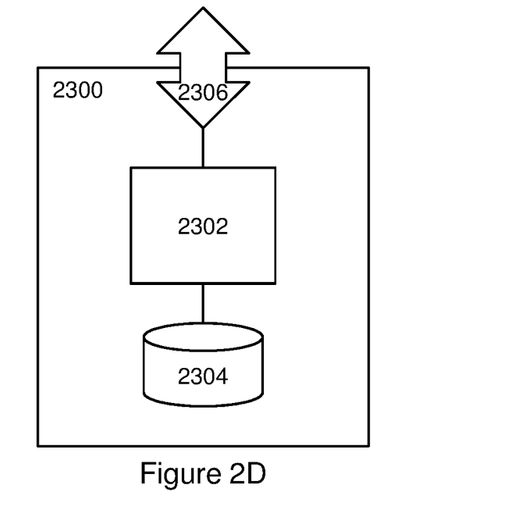
FIG. 2D schematically illustrates an example server.

FIG. 2D schematically illustrates an example server 2300 (which could for example correspond to the server 1300 of FIG. 1) comprising a processor 2302 operably connected to each of a memory 2304 and a transceiver 2306.

Any or all of the access point 2110, biometric-capable device 2120, user device 2130 and server 2300 could comprise additional components not illustrated in FIGS. 2A to 2D; only those most relevant to the present disclosure are shown.

Figure 3:
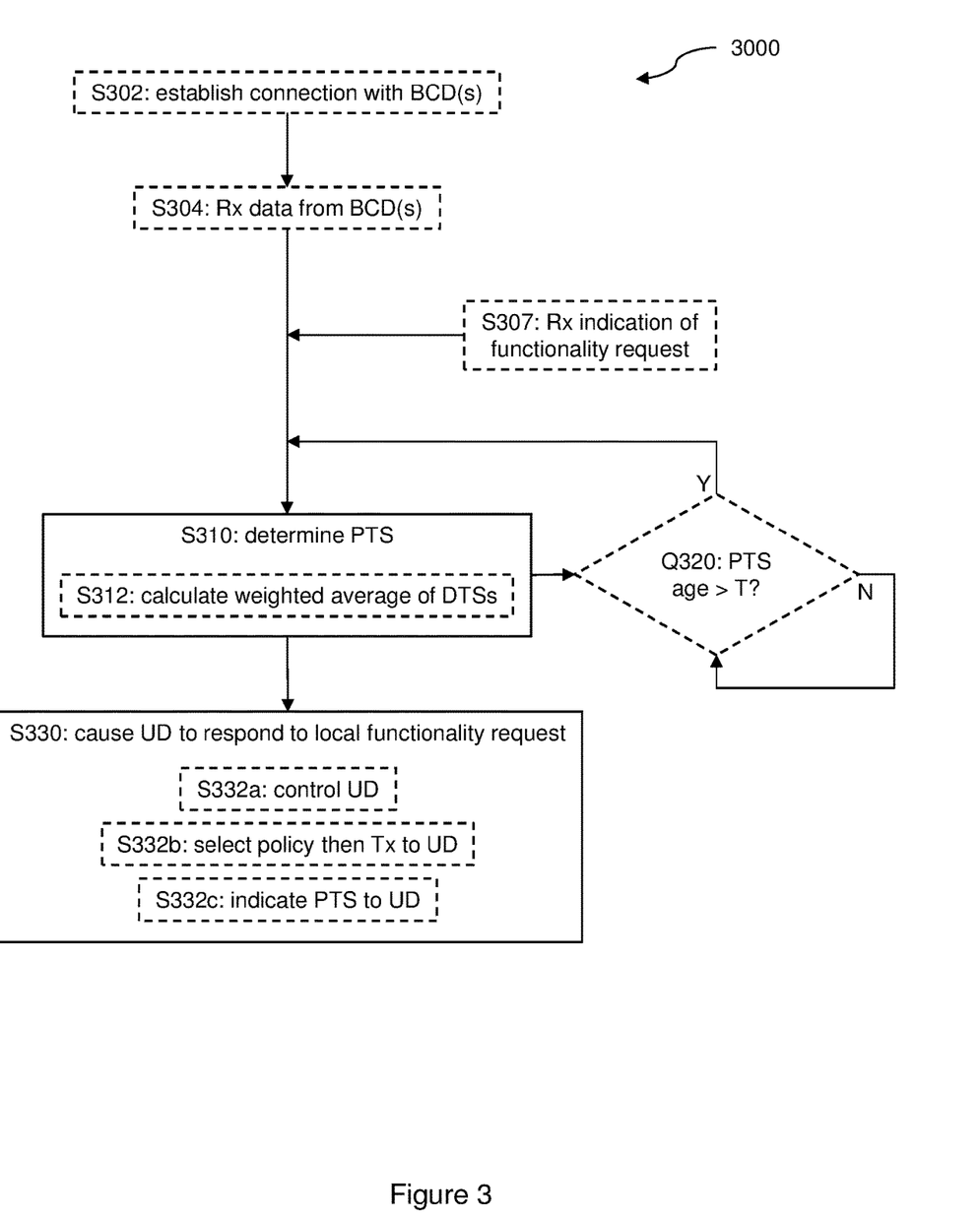
FIG. 3 is a flowchart illustrating a computer-implemented method of securing functionality of a user device connected to a local network provided at a premises.

FIG. 3 is a flowchart illustrating a computer-implemented method 3000 of securing functionality of a user device (such as user devices 1130, 2130 of FIGS. 1 and 2C respectively) connected to a local network provided at a premises (such as premises 1100 of FIG. 1).

The method 3000 can be performed by a suitably configured processor of a data processing system, such as the processor 2112 of the access point 2110 of FIG. 2A, the processor 2132 of the user device 2130 of FIG. 2C or the processor 2302 of the server 2300 of FIG. 2D. The method steps can all be performed by one or more processors of a single device, or could be distributed amongst a plurality of devices. Specific tasks can be allocated according to system requirements and resource availability. For example, tasks requiring low latency can be performed as locally to the user device on which functionality is requested as possible (e.g. at the access point or the user device itself) while resource-intensive processing tasks (i.e. tasks requiring significant processing power and/or memory and/or electrical power) can be performed by devices with more resources to spare (e.g. at the access point or the server).

The method 3000 comprises determining a premises trust score (PTS) indicative of a likelihood that an authorised user of the user device is present at the premises at step S310. The premises trust score determination is in dependence on data received from one or more biometric-capable devices (such as the biometric-capable devices 1120, 2120 of FIGS. 1 and 2B respectively), distinct from the user device, connected to the local network. Said data is indicative of continuous biometric authentication of a current user of the respective biometric-capable device (or a lack thereof, as the case may be).

The data could for example comprise one or more of:
i) a plurality of biometric measurements collected over a time interval;
ii) one or more biometric trust scores, each based on comparison of measurements of a particular biometric by a particular biometric-capable device over a time interval with corresponding reference biometric data; and
iii) one or more device trust scores, each based on one or more biometric trust scores as determined by a particular biometric-capable device, optionally with each biometric trust score being weighted according to a corresponding confidence level associated with the respective biometric.

Which of options i) to iii) is employed can be selected in dependence on the resources (i.e. processing power, memory, electrical power etc.) available at various points in the system the method 3000 is being implemented in. For example, biometric-capable devices with ample resource availability may do some or all of the processing themselves, providing one or more biometric trust scores or a device trust score to the access point. This reduces the load on the device that determines the premises trust score. However, it requires the biometric-capable devices to be provided with suitable functionality, for example via a dedicated application. Biometric-capable devices with sparse resources, at least in comparison to the device that determines the premises trust score, could instead provide only the biometric measurements, leaving the processing to be done elsewhere. All biometric-capable devices connected to the local network could provide the same type of data (in the sense of options i) to iii) above), or the type of data provided could vary between the biometric-capable devices.

The biometric measurements on which the data is based can for example comprise one or more of:
facial recognition images,
iris recognition images,
skin pattern (e.g. one or more of fingerprint, toeprint and palm print) scans,
body geometry measurements (e.g. hand and/or footprints),
vein (e.g. palm vein) pattern scans,
pulse measurements,
gait measurements,
breathing pattern measurements,
chemical signature measurements (e.g. from breath and/or perspiration, including DNA, deoxyribonucleic acid),
voice recognition recordings,
signature and/or generic handwriting recognition scans,
handling signature measurements (e.g. one or more of orientation, direction and/or speed and/or acceleration of translational and/or rotational motion, holding pressure, frequency of interaction and/or changes in and/or patterns of changes in one or more of these)
user interface interaction signature measurements (e.g. characteristic ways of one or more of typing, pressing buttons, interacting with a touch sensitive or gesture control device and viewing a display, for example determined through one or more of: force and pressure on a tactile interface; speed, rhythm, frequency, style and duration of interaction with a tactile or gesture based interface; and visual tracking of a display), and
linguistic analysis measurements (e.g. from free text type and/or voice recordings).

Following step S310, at step S320 the user device (UD) is caused to respond to a request for functionality made through a local user interface it comprises in a manner which depends on the premises trust score. The functionality requested could for example involve expenditure of resources such as one or more of: cash, data allowance, computing resources (e.g. processing time and/or memory and/or electrical power) and personnel time. Alternatively or additionally, the functionality requested could involve access to sensitive information.

Step S310 can be performed periodically so that the premises trust score is kept up to date. Optional query Q320 illustrates this behaviour, wherein following determination of the premises trust score at step S310, it is checked whether the age of the premises trust score is greater than a predetermined period T. If so, the flow returns to repeat step S310. If not, query Q320 is repeated.

Alternatively or additionally, determination of the premises trust score at step S310 can be performed in response to a connection with one of the one or more biometric-capable devices (BCDs) being established over the local network at optional step S302, then the data indicative of continuous biometric authentication of the current user of the respective biometric-capable device being received from that biometric-capable device at optional step S304.

Alternatively or additionally, determination of the premises trust score at step S310 can be performed in response to receiving an indication that the request for functionality has been made at the user device at optional step S307. If the premises trust score is only determined when needed to respond to a request for functionality at a user device then resource savings (processing power, memory, electrical power etc.) can be achieved, but latency of response to the user request is higher than if the premises trust score is determined in advance.

If data indicative of continuous biometric authentication of the current user is received from a plurality of the biometric-capable devices then determining the premises trust score at step S310 can comprise optional step S312, wherein a weighted average of device trust scores indicated by that data for each of the plurality of biometric-capable devices is calculated, each device trust score being indicative of a likelihood that the authorised user of the user device is the current user of the respective biometric-capable device. The weightings can for example correspond to a confidence level associated with each device trust score. This could for example be dependent on how vulnerable to hacking the device is considered to be.

Determination of one or more of the biometric, device and premises trust scores could for example make use of Dempster-Shafer theory.

Causing the user device to respond to the request for functionality at step S330 can comprise controlling the user device to respond to the request for functionality in a particular manner at optional step S332a. Alternatively, step S330 can comprise selecting a policy which defines a permitted response to the request for functionality from a plurality of such policies, the selecting being made in dependence on the premises trust score, then transmitting the selected policy to the user device for the user device to enforce at optional step S332b. As another alternative, step S330 can comprise indicating the premises trust score to the user device at optional step S332c, so that the user device can determine an appropriate response to the functionality request itself.

Any policy applied to determine an appropriate response to the functionality request based on the premises trust score can be stored locally on one or more of the devices involved in that determination, or otherwise accessible to them. Such policies can be static or updateable (e.g. with updates requiring specific authentication such as provision of a password). They can for example be set by a communications network provider or an administrator of the local network (for example a subscriber of a service provided by a communications network provider).

Policies can refer to trust tiers. For example, a policy for a voice assistant device could be defined as follows.

| Trust Score | Policy Tier | Explanation |
| --- | --- | --- |
| 66.6%-100.0% | 3 | All functionality permitted without specific authentication |
| 33.3%-66.5% | 2 | Purchases require specific authentication |
| 0.0%-33.2% | 1 | Purchases and calendar information require specific authentication |

The method 3000 can be embodied by a computer program comprising instructions which, when the program is executed by a computer, cause the computer to carry out the method. Such a computer program can be stored on a computer-readable data carrier or carried by a data carrier signal. It could for example be provided in the form of a dedicated application, or as functionality within an application which manages aspects of the local network. For example, such an application could be provided to subscribers by a telecommunications network provider to assist with joining and/or configuration of devices on the local network and/or connection usage monitoring.

Analysis of biometric measurements to determine one or more of the biometric, device and premises trust scores can for example employ classification technologies such as artificial neural networks. Machine learning can be used to improve the reliability of one or more of the biometric, device and premises trust scores.

Other embodiments will be apparent to those skilled in the art from consideration of the specification and practice of the embodiments disclosed herein. It is intended that the specification and examples be considered as exemplary only.

In addition, where this application has listed the steps of a method or procedure in a specific order, it could be possible, or even expedient in certain circumstances, to change the order in which some steps are performed, and it is intended that the particular steps of the method or procedure claims set forth herein not be construed as being order-specific unless such order specificity is expressly stated in the claim. That is, the operations/steps may be performed in any order, unless otherwise specified, and embodiments may include additional or fewer operations/steps than those disclosed herein. It is further contemplated that executing or performing a particular operation/step before, contemporaneously with, or after another operation is in accordance with the described embodiments.

The methods described herein may be encoded as executable instructions embodied in a computer readable medium, including, without limitation, non-transitory computer-readable storage, a storage device, and/or a memory device. Such instructions, when executed by a processor (or one or more computers, processors, and/or other devices) cause the processor (the one or more computers, processors, and/or other devices) to perform at least a portion of the methods described herein. A non-transitory computer-readable storage medium includes, but is not limited to, volatile memory, non-volatile memory, magnetic and optical storage devices such as disk drives, magnetic tape, compact discs (CDs), digital versatile discs (DVDs), or other media that are capable of storing code and/or data.

Where a processor is referred to herein, this is to be understood to refer to a single processor or multiple processors operably connected to one another. Similarly, where a memory is referred to herein, this is to be understood to refer to a single memory or multiple memories operably connected to one another.

The methods and processes can also be partially or fully embodied in hardware modules or apparatuses or firmware, so that when the hardware modules or apparatuses are activated, they perform the associated methods and processes. The methods and processes can be embodied using a combination of code, data, and hardware modules or apparatuses.

Examples of processing systems, environments, and/or configurations that may be suitable for use with the embodiments described herein include, but are not limited to, embedded computer devices, personal computers, server computers (specific or cloud (virtual) servers), hand-held or laptop devices, multiprocessor systems, microprocessor-based systems, set top boxes, programmable consumer electronics, mobile telephones, network personal computers (PCs), minicomputers, mainframe computers, distributed computing environments that include any of the above systems or devices, and the like. Hardware modules or apparatuses described in this disclosure include, but are not limited to, application-specific integrated circuits (ASICs), field-programmable gate arrays (FPGAs), dedicated or shared processors, and/or other hardware modules or apparatuses.

User devices can include, without limitation, static user devices such as PCs and mobile user devices such as smartphones, tablets, laptops and smartwatches.

Receivers and transmitters as described herein may be standalone or may be comprised in transceivers. A communication link as described herein comprises at least one transmitter capable of transmitting data to at least one receiver over one or more wired or wireless communication channels. Wired communication channels can be arranged for electrical or optical transmission. Such a communication link can optionally further comprise one or more relaying transceivers.

User input devices can include, without limitation, microphones, buttons, keypads, touchscreens, touchpads, trackballs, joysticks, mice, gesture control devices and brain control (e.g. electroencephalography, EEG) devices. User output devices can include, without limitation, speakers, buzzers, display screens, projectors, indicator lights, haptic feedback devices and refreshable braille displays. User interface devices can comprise one or more user input devices, one or more user output devices, or both.

The invention claimed is:

1. A computer-implemented method of securing functionality of a user device connected to a local network provided at a premises, the method comprising:
determining a premises trust score indicative of a likelihood that an authorised user of the user device is present at the premises, the determining being in dependence on:
(i) data received from one or more biometric-capable devices, distinct from the user device, connected to the local network, that data being indicative of continuous biometric authentication of a current user of the respective biometric-capable device; or
(ii) a lack thereof;
then causing the user device to respond to a request for functionality made through a local user interface it comprises in a manner which depends on the premises trust score.

2. The method of claim 1, wherein the determining step is performed periodically.

3. The method of claim 1, wherein the determining is in dependence on the data received from the one or more biometric-capable devices, distinct from the user device, connected to the local network, that data being indicative of continuous biometric authentication of the current user of the respective biometric-capable device, the method further comprising:
establishing a connection with one of the one or more biometric-capable devices over the local network; and
subsequently receiving the data from that biometric-capable device, the determining step being responsive thereto.

4. The method of claim 1,
further comprising receiving an indication that the request for functionality has been made at the user device;
the determining step being performed in response thereto.

5. The method of claim 1, wherein:
the determining is in dependence on the data received from the one or more biometric-capable devices, distinct from the user device, connected to the local network, that data being indicative of continuous biometric authentication of the current user of the respective biometric-capable device;
the data is received from a plurality of the biometric-capable devices;
the method further comprises receiving the data from the plurality of biometric-capable devices; and
the determining step comprises calculating a weighted average of device trust scores indicated by that data for each of the plurality of biometric-capable devices, each device trust score being indicative of a likelihood that the authorised user of the user device is the current user of the respective biometric-capable device.

6. The method of claim 1, wherein the step of causing the user device to respond to the request for functionality comprises one of:
controlling the user device to respond to the request for functionality in a particular manner;
selecting a policy which defines a permitted response to the request for functionality from a plurality of such policies, the selecting being made in dependence on the premises trust score, then transmitting the selected policy to the user device for the user device to enforce; and
indicating the premises trust score to the user device.

7. A non-transitory computer-readable data carrier having stored thereon a computer program comprising instructions which, when the program is executed by a computer, cause the computer to carry out the method of claim 1.

8. The method of claim 1, wherein the step of causing the user device to respond to the request for functionality comprises controlling the user device to respond to the request for functionality in a particular manner.

9. The method of claim 1, wherein the step of causing the user device to respond to the request for functionality comprises selecting a policy which defines a permitted response to the request for functionality from a plurality of such policies, the selecting being made in dependence on the premises trust score, then transmitting the selected policy to the user device for the user device to enforce.

10. The method of claim 1, wherein the step of causing the user device to respond to the request for functionality comprises indicating the premises trust score to the user device.

11. The method of claim 1, wherein the continuous biometric authentication is based on measurements obtained from the user passively such that the user being is not required to knowingly perform any particular prompted or remembered action.

12. A data processing system comprising: at least one hardware processor and memory storing a computer program including instructions which, when executed by the processor, cause the date processing system to secure functionality of a user device connected to a local network provided at a premises, the data processing system being at least to be configured to
determine a premises trust score indicative of a likelihood that an authorised user of the user device is present at the premises, the determining being in dependence on:
(i) data received from one or more biometric-capable devices, distinct from the user device, connected to the local network, that data being indicative of continuous biometric authentication of a current user of the respective biometric-capable device; or
(ii) a lack thereof;
then cause the user device to respond to a request for functionality made through a local user interface it comprises in a manner which depends on the premises trust score.

13. The data processing system of claim 12, comprising:
a local network access point for the local network; and/or
a server outside of, but in communication with, the local network; and/or
the user device.

14. The data processing system according to claim 12, wherein the data processing system is configured to, in order to cause the user device to respond to the request for functionality, control the user device to respond to the request for functionality in a particular manner.

15. The data processing system according to claim 12, wherein the data processing system is configured to, in order to cause the user device to respond to the request for functionality, select a policy which defines a permitted response to the request for functionality from a plurality of such policies, the selection being made in dependence on the premises trust score, then transmit the selected policy to the user device for the user device to enforce.

16. The data processing system according to claim 12, wherein the data processing system is configured to, in order to cause the user device to respond to the request for functionality, indicate the premises trust score to the user device.

17. The data processing system according to claim 12, wherein the data processing system is configured to perform the continuous biometric authentication based on measurements obtained from the user passively such that the user being is not required to knowingly perform any particular prompted or remembered action.

18. The data processing system according to claim 12, wherein:
  the determination of the premises trust score is in dependence on the data received from the one or more biometric-capable devices, distinct from the user device, connected to the local network, that data being indicative of continuous biometric authentication of the current user of the respective biometric-capable device; and the data is received from a plurality of the biometric-capable devices;
  the data processing system is further configured to:
  receive the data from the plurality of biometric-capable devices; and
  calculate a weighted average of device trust scores indicated by that data for each of the plurality of biometric-capable devices, each device trust score being indicative of a likelihood that the authorised user of the user device is the current user of the respective biometric-capable device.

* * * * *